United States Patent
Lawson et al.

(10) Patent No.: US 11,465,495 B2
(45) Date of Patent: Oct. 11, 2022

(54) ELECTRIC DRIVE AXLE WITH MODE ADJUSTMENT MECHANISM AND METHOD FOR OPERATION OF SAID AXLE AND MODE ADJUSTMENT MECHANISM

(71) Applicant: Dana Automotive Systems Group, LLC, Maumee, OH (US)

(72) Inventors: Mitchell R. Lawson, Perrysburg, OH (US); Amar Nivarthi, Canton, MI (US)

(73) Assignee: Dana Automotive Systems Group, LLC, Maumee, OH (US)

( * ) Notice: Subject to any disclaimer, the term of this patent is extended or adjusted under 35 U.S.C. 154(b) by 291 days.

(21) Appl. No.: 16/825,939

(22) Filed: Mar. 20, 2020

(65) Prior Publication Data
US 2021/0291645 A1 Sep. 23, 2021

(51) Int. Cl.
*B60K 23/04* (2006.01)
*B60K 17/02* (2006.01)
*B60K 17/16* (2006.01)
*B60K 6/383* (2007.10)
*F16D 23/14* (2006.01)
(Continued)

(52) U.S. Cl.
CPC ............... *B60K 23/04* (2013.01); *B60K 1/00* (2013.01); *B60K 17/02* (2013.01); *B60K 17/08* (2013.01); *B60K 17/16* (2013.01); *F16D 23/14* (2013.01); *F16D 23/148* (2013.01); *B60K 6/26* (2013.01); *B60K 6/36* (2013.01); *B60K 6/383* (2013.01); *B60K 2023/046* (2013.01); *B60Y 2200/91* (2013.01); *B60Y 2200/92* (2013.01); *B60Y 2400/427* (2013.01); *B60Y 2400/60* (2013.01); *B60Y 2400/80* (2013.01)

(58) Field of Classification Search
CPC .......... B60K 23/04; B60K 1/00; B60K 17/02; B60K 17/08; B60K 17/16; B60K 6/26; B60K 6/36; B60K 6/383; B60K 2023/046; B60Y 2200/91; B60Y 2200/92; B60Y 2400/427; B60Y 2400/60; B60Y 2400/80; F16D 23/148; F16D 23/14
See application file for complete search history.

(56) References Cited

U.S. PATENT DOCUMENTS 8,079,453 B2 * 12/2011 Kimes ................... F16D 41/125
192/65
8,801,556 B2 * 8/2014 Kato ........................ B60K 6/48
475/5

(Continued)

FOREIGN PATENT DOCUMENTS

EP        3181437 A1 * 6/2017 .............. B62M 6/45

*Primary Examiner* — Tinh Dang
(74) *Attorney, Agent, or Firm* — McCoy Russell LLP

(57) ABSTRACT

Systems and methods for an electric drive axle are provided. In one example, the electric drive axle may include an electric motor-generator rotationally coupled to a gearbox having a one-way clutch mounted on an output shaft and operable in an engaged configuration and a disengaged configuration, where in the engaged configuration, the one-way clutch transfers rotational energy from the output shaft to an output gear rotationally coupled to a plurality of drive wheels. The gearbox further includes a mode adjustment mechanism including a lock ring rotationally coupled to the output shaft and configured to selectively engage an input gear and the one-way clutch in a plurality of operating modes.

18 Claims, 5 Drawing Sheets

(51) Int. Cl.
    *B60K 1/00*    (2006.01)
    *B60K 17/08*    (2006.01)
    *B60K 6/36*    (2007.10)
    *B60K 6/26*    (2007.10)

(56) References Cited

U.S. PATENT DOCUMENTS

| | | | | |
|---|---|---|---|---|
| 2008/0115995 | A1* | 5/2008 | Holland | B62K 5/027 180/215 |
| 2015/0217861 | A1* | 8/2015 | Cox | F16D 41/16 301/6.2 |
| 2018/0328455 | A1* | 11/2018 | Yoneda | F16H 3/10 |
| 2020/0232515 | A1* | 7/2020 | Copeland | F16D 11/14 |

\* cited by examiner

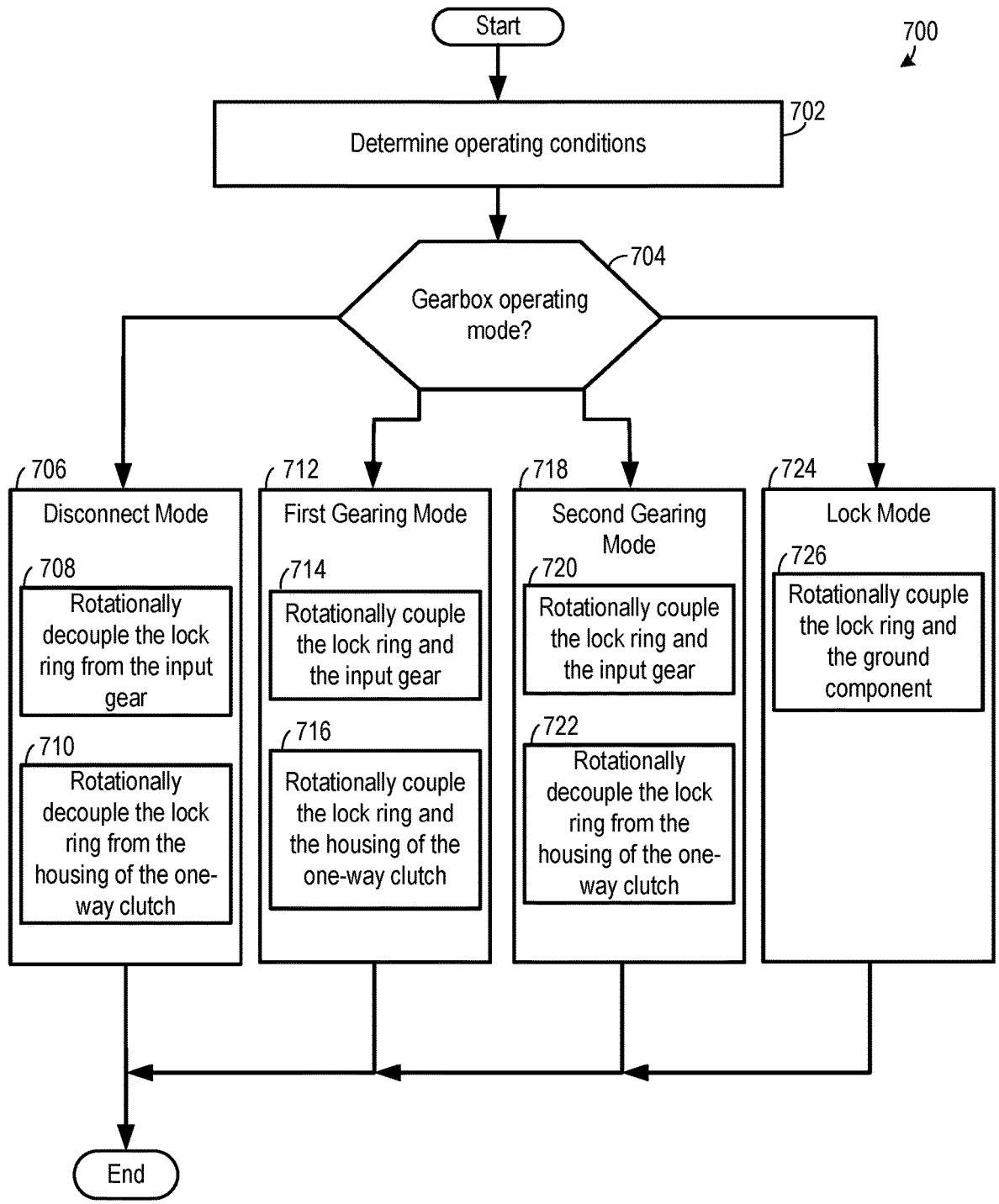

ELECTRIC DRIVE AXLE WITH MODE ADJUSTMENT MECHANISM AND METHOD FOR OPERATION OF SAID AXLE AND MODE ADJUSTMENT MECHANISM

TECHNICAL FIELD

The present disclosure relates to an electric drive axle with a mode adjustment mechanism and a method for operation of the electric drive axle and mode adjustment mechanism.

BACKGROUND

Electric and hybrid-electric vehicles harness energy from batteries or other suitable energy sources coupled to an electric motor-generator to produce motive power for the vehicle. Electric drive axles, in some cases, allow for efficient and relatively low cost integration of electric motors into vehicles, when compared to other vehicle electrification approaches presenting motor integration challenges.

Electric drive axles may have energy recovery and motive power generation capabilities. For instance, to produce motive power the electric motor draws down the battery to impart rotational energy to the axles. Conversely, in a regeneration mode, the motor generates electrical energy for recharging the battery using rotational energy from the axles.

The inventors have recognized that during certain operating conditions, disconnection of the motor from the axle may be desirable, but has previously been unavailable. For instance, the electric motor, in prior systems, generates excess current during certain operating conditions, such as when the vehicle is towed. However, the battery may not have the capacity to store the additional current generated during these conditions. Therefore, battery damage caused by overcharging may occur if the excess current is not dissipated. The inventors have also recognized a need, to lock the motor and/or gearbox, during certain operating scenarios, such as while the vehicle is parked. However, previous electric drive axles have not provided features for locking-up the motor and gearbox.

SUMMARY

To address at least some of the abovementioned problems an electric drive axle is provided. In one example, the electric drive axle may include an electric motor-generator rotationally coupled to a gearbox having a one-way clutch mounted on an output shaft. The one-way clutch is designed for operation in both an engaged configuration and a disengaged configuration. In the engaged configuration, the one-way clutch transfers rotational energy from the output shaft to an output gear rotationally coupled to a plurality of drive wheels. The gearbox further includes a mode adjustment mechanism having a lock ring rotationally coupled to the output shaft. The lock ring, depending on its operational modality, engages an input gear and/or the one-way clutch. The adjustable lock ring allows the mode adjustment mechanism to be efficiently incorporated into the gearbox. Furthermore, the adjustable lock ring allows the gearbox to be operated in different modes (e.g., disconnect mode, different gearing modes, and/or a lock mode), if desired. Consequently, the electric drive axle's operating modalities can be expanded to include motor-disconnect, gear shifting, and/or parking functionality, for example, while also achieving a relatively compact axle arrangement, if wanted.

In one example, the mode adjustment mechanism is designed to operate in a disconnect mode. In the disconnect mode, the lock ring is rotationally disconnected from the input gear and the one-way clutch. In this way, the electric motor-generator can be disconnected from the drive wheels, when wanted. For instance, the disconnect mode may be implemented when a state of charge of an energy storage device coupled to the electric motor-generator exceeds a threshold value (e.g., an upper threshold of the device's storage capacity). Such a condition may occur while a vehicle with the electric drive axle is being towed. Consequently, excessive current generation by the motor-generator can be avoided. As a result, overcharging of the energy storage device is prevented.

In yet another example, the mode adjustment mechanism is designed to operate in a lock mode. In the lock mode, the lock ring is rotationally engaged with a stationary ground spline. In this way, the gearbox can be held in a substantially stationary configuration which may be beneficial when the vehicle is parked, for example. Consequently, the chance of the vehicle unintentionally moving when it is parked can be reduced.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 7 shows a method for operation of a gearbox.

FIGS. 2-6 are drawn approximately to scale. However, other relative dimensions may be used, in other embodiments.

DETAILED DESCRIPTION

An electric drive axle with motor disconnect functionality is described herein. A mode adjustment mechanism is integrated into the drive axle to allow for the rotational decoupling of the motor from gears in the drive axle. The mode adjustment mechanism provides an elegant and efficient approach for rotationally connecting and disconnecting an electric motor-generator from gears in the drive axle. Consequently, the production cost of the drive axle can be reduced along with the profile of the axle, if desired.

Increasing axle compactness expands axle adaptability, allowing for more efficient integration of the axle into different types of vehicles, if wanted. The mode adjustment mechanism, in one example, includes an adjustable lock ring in a gearbox designed to engage/disengage a one-way clutch and input gear rotationally coupled to an electric motor-generator. The lock ring's arrangement depends upon the mode adjustment mechanism's operational state. In a disconnect mode, the lock ring is disengaged from both the one-way clutch and the input gear, decoupling the electric motor-generator from the vehicle's axle. Conversely, in one gearing mode, the lock ring is rotationally coupled to the input gear and an output shaft driving the one-way clutch and in another gearing mode the lock ring is rotationally coupled to a housing of the one way clutch. The different gearing modes allow the gear ratio in the gearbox to be adjusted when the axle is driven via the motor-generator. Motor-axle disconnection allows conditions to be avoided where excess current is generated by the motor-generator, for example. For instance, towing of the vehicle while motor and axle coupling persists, creates unwanted current having the potential to overload the vehicle battery. As such, placing the gearbox in the disconnect mode when a state of charge of an energy storage device coupled to the electric motor-generator surpasses a threshold (e.g., an upper threshold of the device's storage capacity such as 90% capacity, 95% capacity, 99% capacity, etc.), avoids overcurrent generation. In another example, the mode adjustment mechanism may also be designed to operate in a lock mode where the lock ring engaged with a stationary spline (e.g., ground spline). In this way, gears in the gearbox can be substantially stopped from rotating, in the lock mode. The lock mode may be implemented when the vehicle incorporating the electric drive axle is parked. Consequently, the gearbox's functionality is further expanded.

Figure 1:
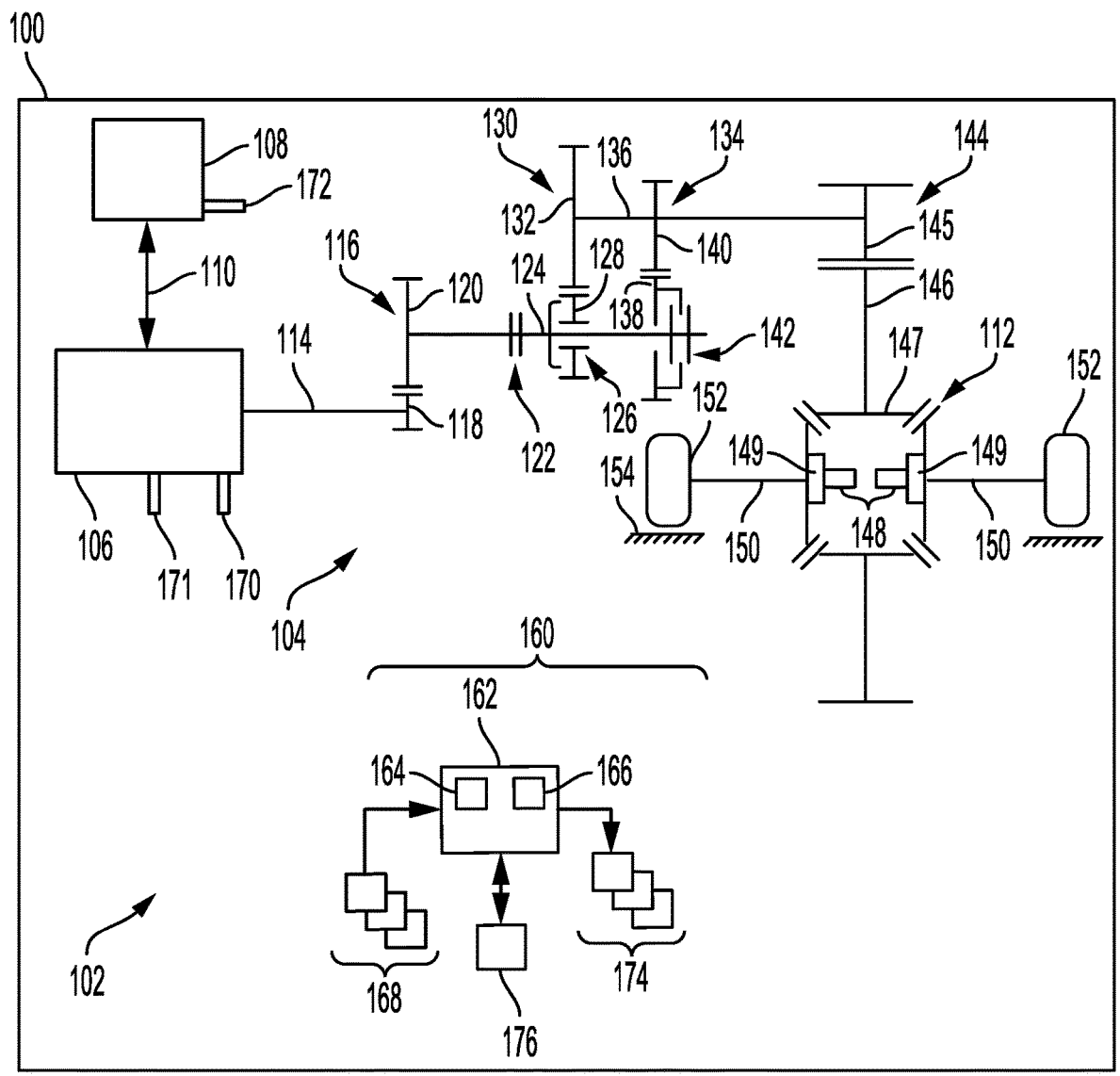
FIG. 1 is a schematic representation of a vehicle including an electric drive axle having a gearbox with a mode adjustment mechanism.

FIG. 1 schematically illustrates a vehicle with a gearbox having a mode adjustment mechanism located between an electric motor-generator and gearing for a drive axle. FIGS. 2-5 depict an embodiment of a mode adjustment mechanism in a gearbox in different operating modes. FIG. 6 shows an embodiment of a one-way clutch in the form of a sprag clutch. FIG. 7 shows an exemplary modal control technique for the mode adjustment mechanism in the gearbox. Exemplary as expressed herein does not give any sort of preferential indication but rather denotes potential aspects of the system.

FIG. 1 shows a schematic depiction of a vehicle 100 having an electric drive axle 102 with a gearbox 104 and electric motor-generator 106. The stick diagram of FIG. 1 provides a topology of the vehicle, gearbox, and corresponding components. However, it will be understood that the vehicle, gearbox, and corresponding components have greater structural complexity than is captured in the FIG. 1. The structural details of various facets of the gearbox 104 are illustrated, by way of example, in greater detail herein with regard to FIGS. 2-5.

The vehicle 100 includes an electric motor-generator 106 electrically coupled to an energy storage device 108 (e.g., battery, capacitor, and the like). Arrows 110 signify the energy transfer between the electric motor-generator 106 and the energy storage device 108. The electric motor-generator 106 may include conventional components for generating rotational energy and/or electrical energy for recharging the energy storage device 108. For instance, the electric motor-generator 106 may include a rotor electromagnetically interacting with a stator, to provide the aforementioned energy transfer functionality.

The vehicle may take a variety of forms. For example, the vehicle 100 may be hybrid vehicle where both the electric motor-generator 106 and an internal combustion engine (not shown) are utilized for motive power generation. For instance, in one use-case hybrid vehicle configuration, the internal combustion engine may assist in recharging the energy storage device, during certain conditions. In another use-case hybrid vehicle configuration, the internal combustion engine may be configured to provide rotational energy to a differential 112 or other suitable locations in the gearbox 104. In yet another use-case hybrid vehicle configuration, the engine may provide rotational input to another drive axle (not shown). Further, in other examples, the vehicle may be a battery electric vehicle (BEV) where the internal combustion engine is omitted.

The electric motor-generator 106 includes a shaft 114 rotationally coupled to a first set of gears 116. Press fitting, welds, pins, combinations thereof, etc., may be used to accomplish the rotational attachment between the shaft 114 and the first set of gears 116. In the illustrated embodiment, the first set of gears 116 includes a first gear 118 and a second gear 120. In the context of a mode adjustment mechanism 122, the second gear 120 may be referred to as an input gear. Furthermore, the first set of gears 116 may be reduction gears, for example. In one specific use-case example, the gear ratio of the first set of gears may be 3:5:1. However, numerous suitable gear ratios have been envisioned, including non-reduction gearing, as well as a gear set with an alternate number of gears. For instance, the first set of gears may include a single gear or more than three gears, in some embodiments.

The gearbox 104 includes the mode adjustment mechanism 122 configured to selectively engage a rotational shaft 124 as well as a one-way clutch 126. In the context of the mode adjustment mechanism, the rotational shaft 124 may be referred to as an output shaft. Furthermore, the second gear 120, may in one example, be designed to independently rotate with regard to the rotational shaft 124 during certain operating conditions. To elaborate, the mode adjustment mechanism 122 may be designed to operate in a plurality of modes. In a disconnect mode, the mode adjustment mechanism 122 rotationally disconnects the second gear 120 (e.g., input gear) in the first set of gears 116 from the rotational shaft 124. Conversely, in different gearing modes, the mode adjustment mechanism 122 provides different toque transfer paths through the gearbox using rotational input from the first set of gears 116. A modal control scheme for the mode adjustment mechanism 122 is described in greater detail herein with regard to FIG. 7. Additionally, the functionality and structural layout of the mode adjustment mechanism 122 is expanded upon with regard to the embodiment of the mode adjustment mechanism, depicted in FIGS. 2-5 and described in greater detail herein.

When the mode adjustment mechanism 122 is in a second gearing mode (e.g., an active-clutch gearing mode), the one-way clutch 126 is configured to transfer rotational energy from the rotational shaft 124 to a first gear 128 in a second set of gears 130, when receiving rotational input in a first direction. In the context of the mode adjustment mechanism 122, the first gear 128 in the second set of gears 130 may be referred to as an output gear. Conversely, in the second gearing mode, when the one-way clutch 126 receives rotational input in a second direction, the clutch freewheels (e.g., rotationally decouples the rotational shaft 124 from the first gear 128).

The second set of gears 130 may further include a second gear 132 rotationally coupled to the first gear 128. However, additional or alternative gears may be included in the second gear set, in other examples. The second set of gears 130 may have a variety of gear ratios. In one specific use-case example, the gear ratio of the second set of gears may be 2:2:1. However, other suitable gear ratios have been envisioned.

The second set of gears 130 is rotationally coupled a third set of gears 134 via a rotational shaft 136, in the illustrated embodiment. The third set of gears 134 may include a first gear 138 and a second gear 140. However, in other embodiments the third set of gears 134 may be omitted from the gearbox 104 or may include an alternate number of gears. The third set of gears 134 may have a variety of gear ratios. In one specific use-case example, the gear ratio of the third set of gears may be 1:1. However, other suitable gear ratios have been envisioned.

The second set of gears 130 and the third set of gears 134 may have distinct gear ratios to allow the gearbox to be adapted for different driving conditions. For instance, the second set of gears 130 may have a lower gear ratio than the third set of gears 134. The lower gear ratio may be beneficial in scenarios where a higher-toque and lower-speed output is desired, such as off-road driving scenarios, high vehicle load conditions, etc. However, different gear ratios variances have been contemplated.

The gearbox 104 also may include a clutch 142. The clutch 142 is configured to rotationally couple/decouple the rotational shaft 124 to/from a third set of gears 134, in the illustrated embodiment. For instance, the clutch 142 may connected and disconnect the third set of gears 134 from the rotational shaft 124. To accomplish the disconnect functionality, the clutch 142 may include a friction clutch device, dog clutch device, and the like. Electric actuators, pneumatic actuators, hydraulic actuators, combinations therefore, etc., may be used to adjust the clutch 142. However, in other examples the clutch 142 and the third set of gears 134 may be omitted from the gearbox 104.

The gearbox 104 may also include a fourth set of gears 144 rotationally coupled to the differential 112. However, in other examples the fourth set of gears 144 may not be included in the gearbox 104. The fourth set of gears 144 includes a first gear 145 and a second gear 146, in the illustrated example. However, in other examples the fourth set of gears may include an alternate number of gears or may be omitted from the gearbox. The fourth set of gears 144 may have a variety of gear ratios. In one specific use-case example, the gear ratio of the fourth set of gears may be 3:3:1. However, other suitable gear ratios have been envisioned.

The differential 112 may include a case 147 with pinion gears 148 enclosed therein. The pinion gears 148 are rotationally coupled to side gears 149 which are in turn rotationally coupled to shafts 150. The differential 112 may include additional components such as bearings and/or have an alternative configuration allowing for the transfer of rotational energy to the shafts 150. Types of differentials such as locking differentials, limited slip differentials, etc., have been contemplated. The shafts 150 are rotationally coupled to drive wheels 152 contacting a driving surface 154.

The vehicle 100 may also include a control system 160 with a controller 162. The controller 162 includes a processor 164 and memory 166. The memory 166 may hold instructions stored therein that when executed by the processor cause the controller 162 to perform the various methods, control techniques, etc., described herein. The processor 164 may include a microprocessor unit and/or other types of circuits. The memory 166 may include known data storage mediums such as random access memory, read only memory, keep alive memory, combinations thereof, etc. Furthermore, it will also be understood that the memory 166 may be non-transitory memory.

The controller 162 may receive various signals from sensors 168 coupled various locations in the vehicle 100 and gearbox 104. The sensors may include a motor-generator speed sensor 170, an energy storage device temperature sensor 171, an energy storage device state of charge sensor 172, etc. The controller 162 may also send control signals to various actuators 174 coupled at different locations in the vehicle and gearbox. For instance, the controller 162 may send signals to the electric motor-generator 106 and the energy storage device 108 to adjust the rotational speed and/or direction of the motor-generator. The controller 162 may also be configured to adjust the modal configuration of the mode adjustment mechanism 122. For instance, the controller 162 may send a control command to an actuator in the mode adjustment mechanism to place the mechanism in one of the operating modes (e.g., a disconnect mode, a first gearing mode, a second gearing mode, or a lock mode). The other controllable components in the vehicle and gear system may function in a similar manner with regard to command signals and actuator adjustment. For instance, the clutch 142 may receive command signals from the controller 162.

The vehicle 100 may also include an input device 176 (e.g., a gear selector such as a gear stick, gear lever, etc.), console instrument panel, touch interface, touch panel, keyboard, mouse, combinations thereof, etc.) The input device 176, responsive to driver input, may generate a mode request indicating a desired operating mode for the gearbox. For instance, in a use-case example, the driver may shift a gear selector into a disconnect position to generate a disconnect mode request at the controller. In response, the controller commands components (e.g., lock ring) in the gearbox to transition to the disconnect mode. However, in other examples more automated gearbox mode transitions may be implemented. For instance, the controller may automatically place the gearbox in the disconnect mode when, for example, the battery's state of charge has surpassed a threshold level. Different modal control strategies have been contemplated and are described in greater detail herein with regard to FIG. 7.

FIGS. 2-5 depict an embodiment of a mode adjustment mechanism 200 in a gearbox 202. It will be understood that the mode adjustment mechanism 200 and gearbox 202, shown in FIGS. 2-5, are examples of the mode adjustment mechanism 122 and the gearbox 104, shown in FIG. 1. Therefore, the mode adjustment mechanism 200 and the gearbox 202, shown in FIGS. 2-5, may be included in the vehicle 100, shown in FIG. 1, as well as include the features of the mechanism and gearbox of FIG. 1 or vice versa, in other embodiments.

An axis system 260 is provided in FIGS. 2-6 to establish a common frame of reference. The axis system 260 includes a radial axis 262 and a rotational axis 264. It will be understood that a radial direction is any direction perpendicular to the rotational axis 264. Furthermore, the rotational axis 264 denotes the axis about which some of the components of the mode adjustment mechanism rotate. To elaborate, the rotational axis 264 is the rotational axis of an output shaft 216 and the components mounted thereto.

FIGS. 2-5 illustrate the mode adjustment mechanism 200 in four distinct modes (e.g., the disconnect mode, the first gearing mode, the second gearing mode, and the lock mode).

Figure 2:
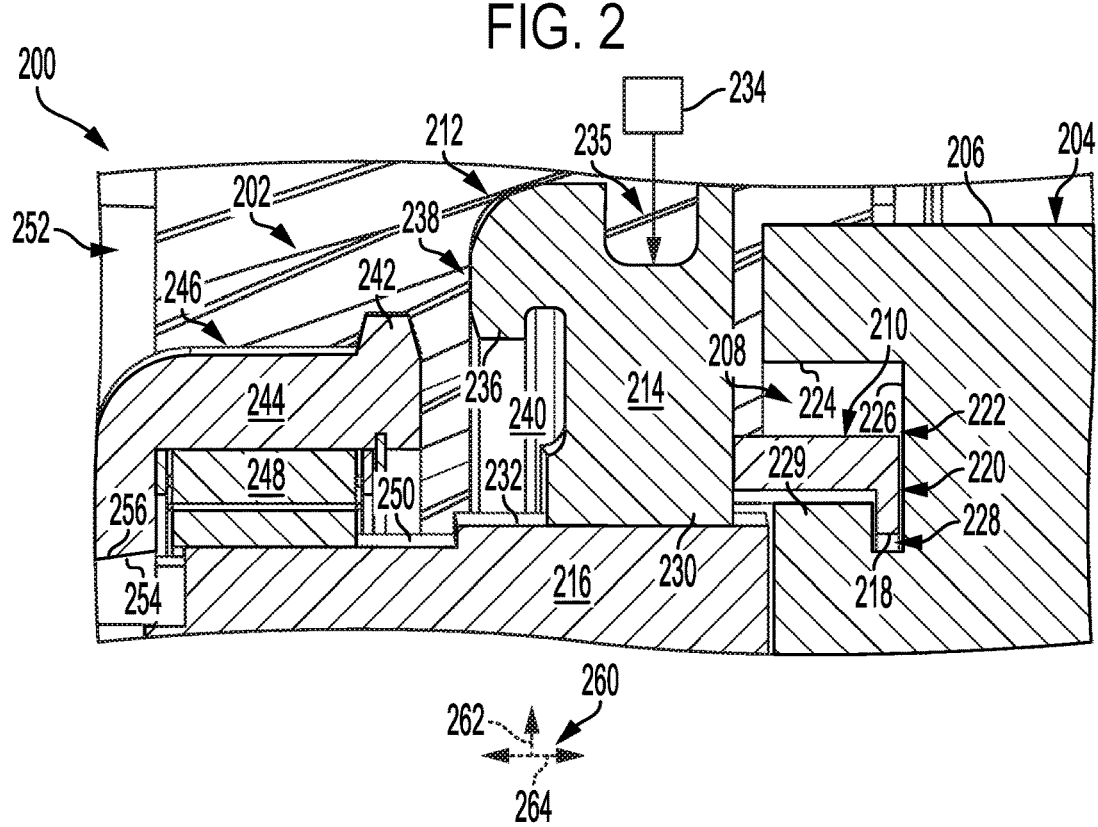
FIG. 2 shows a cross-sectional view of an example of a gearbox including a mode adjustment mechanism operating in a disconnect mode.

Turning to FIG. 2, where the mode adjustment mechanism 200 is in a disconnect mode of operation. The mode adjustment mechanism 200 includes an input gear 204. The input gear 204 may be rotationally coupled to a shaft of an electric motor-generator, such as the electric motor-generator 106, illustrated in FIG. 1. The input gear 204 may include teeth 206 meshing with teeth in gears attached to the motor-generator's shaft such as the first gear 118, shown in FIG. 1. However, other suitable components such as chains, belts, etc., may be used for motor-input gear attachment, in other examples.

The input gear 204 includes a recess 208 in which an extension 210 of a lock ring 212 resides. Positioning the extension 210 of the lock ring 212 in the recess 208 of the input gear increases the compactness of the gearbox. The extension 210 protrudes from a body 214 of the lock ring 212 mounted on an output shaft 216. The output shaft 216 and the input gear 204 may not be directly rotationally coupled to one another and therefore, during certain operating conditions (e.g., the disconnect mode), independently rotate. The output shaft 216 may be coupled to one or more shaft bearings (not shown) to enable rotation thereof. Likewise, the input gear 204 may be coupled to a gear bearing (not shown) to allow the gear to rotate. As described herein, a bearing is a device allowing for rotation of components attached thereto and may include races, roller elements (e.g., spherical rollers, cylindrical rollers, tapered rollers, needle rollers, etc.), etc.

The lock ring extension 210 includes a spline 218. As defined herein, a spline is a section of a component with radially aligned protrusions and grooves. For instance, in one exemplary spline, protrusions and grooves may sequentially alternate in a circumferential direction around the component. It will also be appreciated that the splines described herein may be either internal or external splines. The spline 218 is shown on an interior side of a section 220 of the extension 210 protruding radially inward. However, the spline 218 may be included on the outer side 222 of the extension 210 which may in some instances protrude radially outward, in other examples. The recess 208 includes an outer wall 224 and radially aligned wall 226. However, the recess 208 may have a different profile, in other examples. The recess also includes a slot 228. When an end of the extension section 220 with the spline 218 resides in the slot 228 the input gear 204 is rotationally decoupled from the lock ring 212. To elaborate, the spline 218 remains detached from a spline 229 in the input gear 204 when residing in the slot 228. In this way, the input gear 204 and the output shaft 216 can independently rotate in the disconnect mode, resulting in decoupling of the motor-generator from gears in the gearbox 202. Placing the gearbox 202 in the disconnect mode may be desirable during certain operating conditions, such as when the energy storage device has reached a charging threshold (e.g., an upper charging threshold such as 95% capacity, 98% capacity, 99% capacity, etc.). The device's charging threshold may be reached during conditions such as towing of the vehicle. As such, the disconnect mode may be implemented when the vehicle is being towed or anticipated to be towed.

The body 214 of the lock ring 212 is designed to axially translate with regard to the output shaft 216. The body 214 includes a spline 230 mating with a spline 232 in the output shaft 216. The splines in the lock ring body 214 and the output shaft 216 may accommodate for axial translation of the lock ring with regard to the shaft to place the mode adjustment mechanism in different operating modes.

An actuator 234 coupled to the lock ring 212 is designed to axially translate the lock ring 212 in opposing axial directions. The actuator 234 may include a shift fork, piston, solenoid, etc., to allow the actuator to move the lock ring 212 into the different modal positions. For instance, a shift fork collar may mate with a groove 235 in the lock ring 212 and urge the ring axially toward and away from the housing 244 of the one-way clutch 246.

The lock ring 212 may include another spline 236 and extension 238. To elaborate, the spline 236 is located in an undercut region 240 of the lock ring 212. However, other spline locations have been contemplated. The spline 236 is shown spaced away from a spline 242 in a housing 244 of a one-way clutch 246. However, in the first gearing mode of the mode adjustment mechanism the splines 236 and 242 are engaged with one another.

The one-way clutch 246, in the illustrated example, includes sprag mechanisms 248 positioned between the housing 244 and an outer surface 250 of the output shaft 216. The sprag clutch provides quick and efficient engagement/disengagement action as well as low drag in the freewheel configuration. However, other suitable types of one-way clutches may be used in other examples, such as one-way roller ramp clutches, wedge ramp clutches, etc. When rotational input is provided to the clutch in a first direction the sprag mechanisms 248 allow the output shaft 216 to freewheel. Conversely, when rotational input is provided to the clutch in the opposite direction the sprag mechanisms 248 frictionally engage the outer surface 250 of the output shaft 216, allowing the housing 244 and output shaft 216 to rotate in unison.

The housing 244 of the one-way clutch 246 is coupled to an output gear 252. To elaborate, the housing 244 may include teeth 254 meshing with teeth 256 in the output gear 252. However, in other examples the housing 244 may be rotationally attached to the output gear using another suitable technique. In turn, the output gear may be coupled to a plurality of drive wheels, such as the drive wheels 152 shown in FIG. 1, by way of additional gears, a differential, axle shafts, etc.

Figure 3:
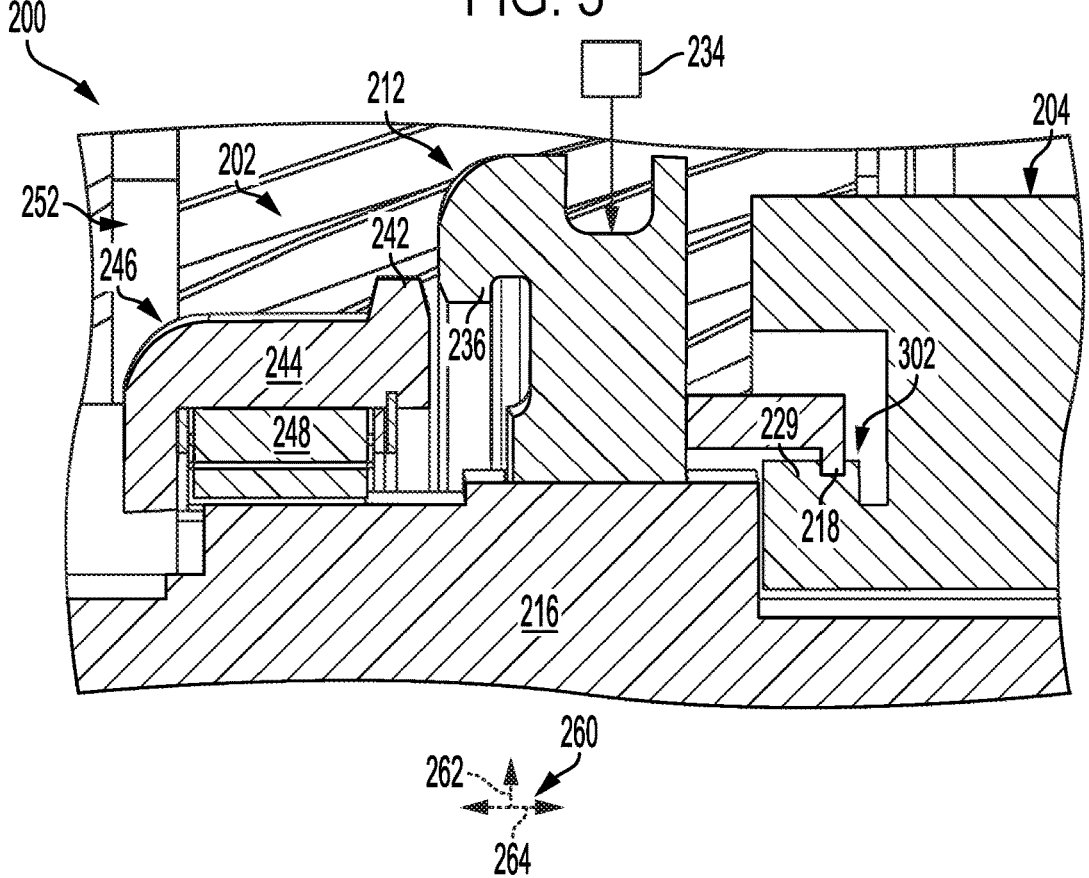
FIG. 3 shows the gearbox with the mode adjustment mechanism, depicted in FIG. 2, operating in a first gearing mode.

FIG. 3 shows the mode adjustment mechanism 200 in the gearbox 202 in the second gearing mode (e.g., active-clutch gearing mode). The input gear 204, lock ring 212, one-way clutch 246, output shaft 216, and output gear 252 are again illustrated. However in FIG. 3, the actuator 234 has axially translated the lock ring 212 toward the one-way clutch 246 to engage the spline 218 in the lock ring 212 with the spline 229 in the input gear 204. The spline 229 in the input gear 204 is positioned on a radially inward side 302 of the recess 208. In this way, the torque transfer path travels from the input gear 204 to the lock ring 212 and then to the output shaft 216. From the output shaft 216, torque will travel through the one-way clutch 246 to the output gear 252 when the sprags 248 are engaged. However, when the sprags 248 are disengaged the output shaft 216 will freewheel with regard to the output gear 252. FIG. 3 also shows the spline 236 in the lock ring 212 spaced away and disengaged from the spline 242 in the housing 244 of the one-way clutch 246.

Figure 4:
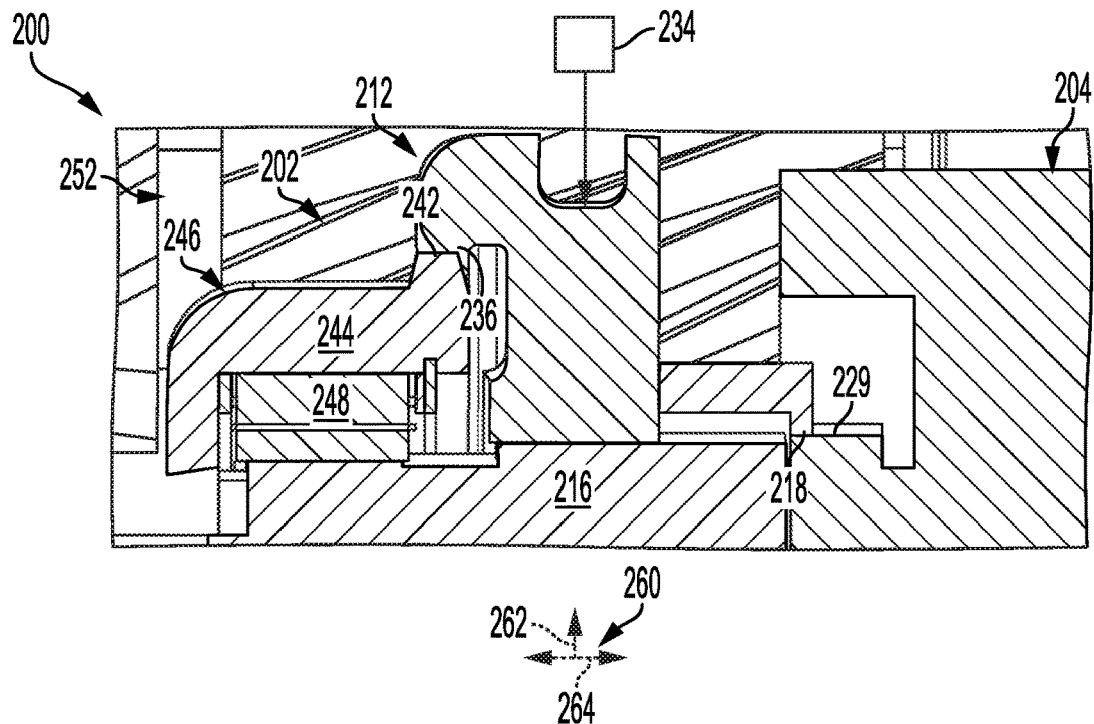
FIG. 4 shows the gearbox with the mode adjustment mechanism, depicted in FIG. 2, operating in a second gearing mode.

FIG. 4 shows the mode adjustment mechanism 200 in the first gearing mode (e.g., clutch-bypass gearing mode). The input gear 204, lock ring 212, one-way clutch 246, output shaft 216, and output gear 252 are again illustrated. However, to enter into the first gearing mode, the actuator 234 axially translates the lock ring 212 further towards the one-way clutch 246 such that the spline 236 in the lock ring 212 is engaged with the spline 242 in the housing 244. The lock ring 212 also maintains engagement between the spline 218 in the lock ring 212 and the spline 229 in the input gear 204, in the first mode. In this way, the torque transfer path, in the first gearing mode, travels through the input gear 204 to the lock ring 212, from the lock ring to the housing 244 of the one-way clutch 246, and from the housing of the one-way clutch to the output gear 252. Thus, the freewheel function of the one-way clutch is negated in the first gearing mode. It will be appreciated that in the first gearing mode back driving of the one-way clutch may be avoided. The first gearing mode may be implemented when low speed vehicle travel is desired and/or reverse gearbox operation is wanted.

Figure 5:
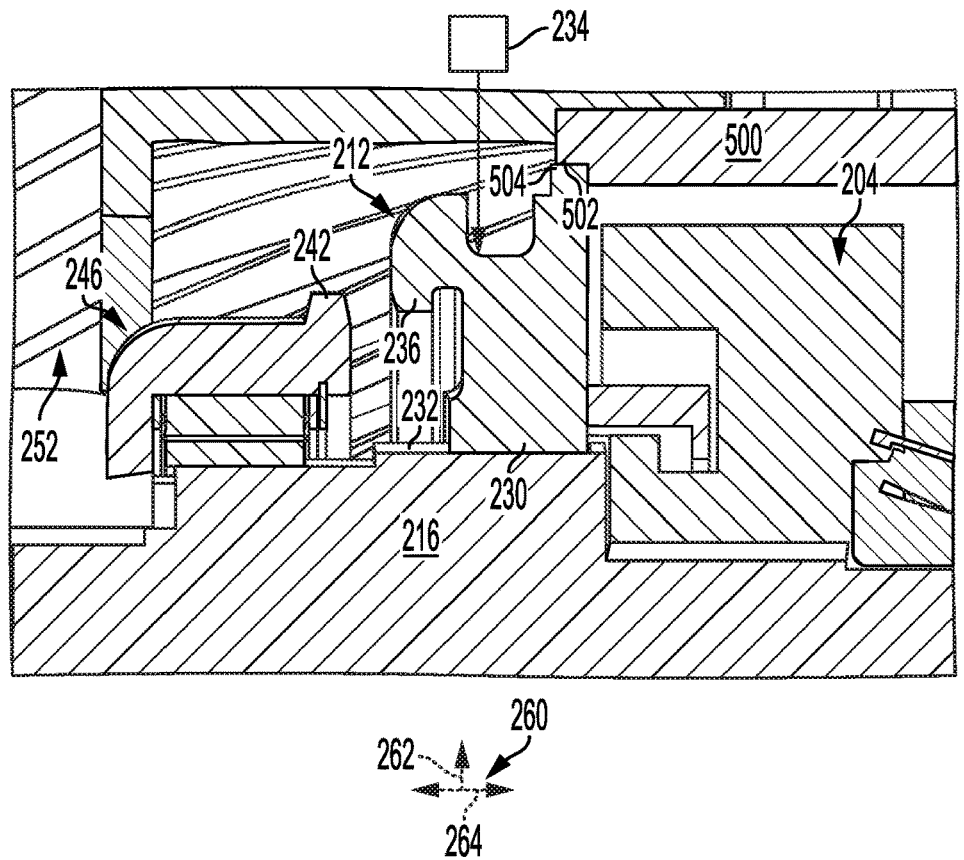
FIG. 5 shows the gearbox with the mode adjustment mechanism, depicted in FIG. 2, operating in a lock mode.
Figure 6:
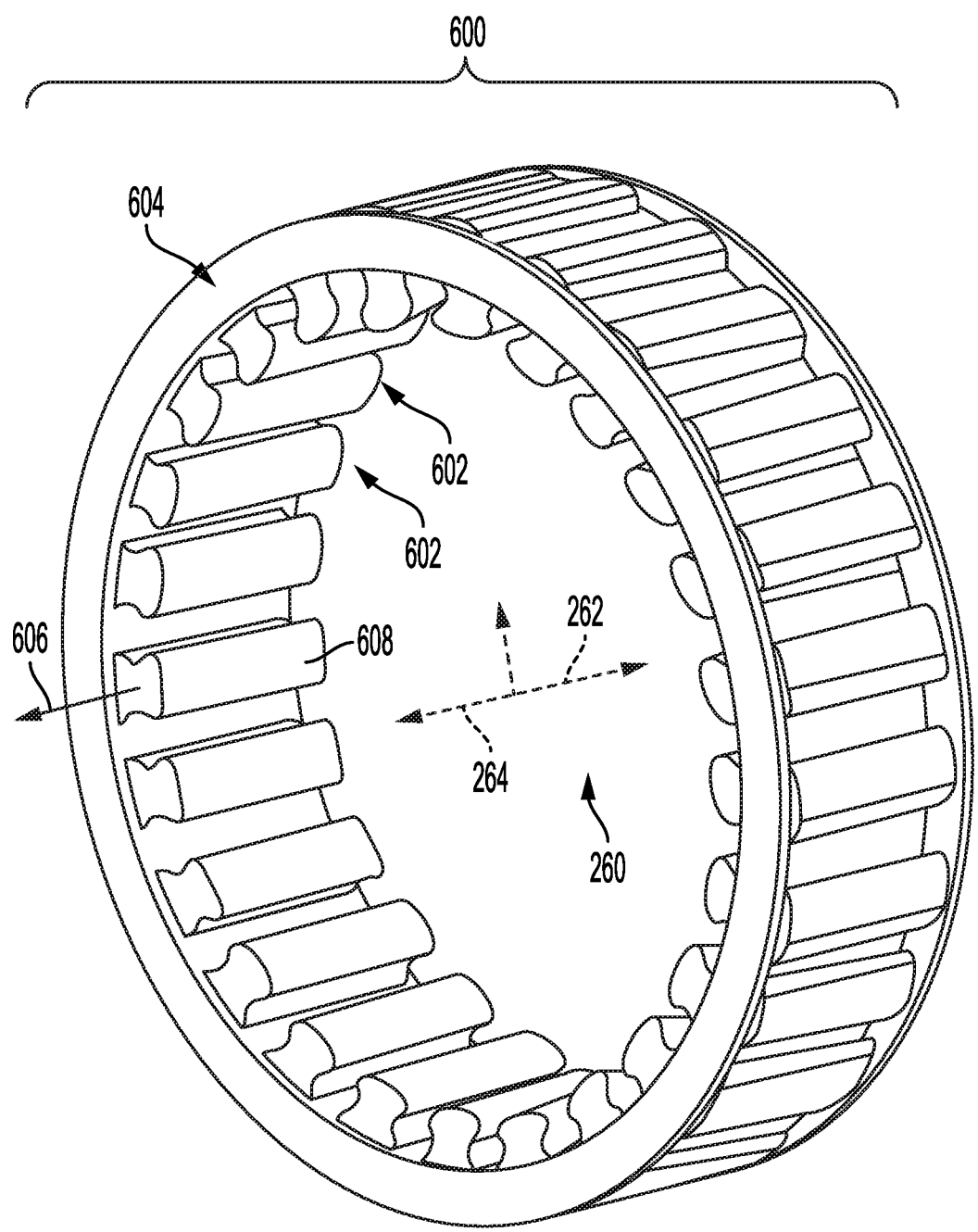
FIG. 6 shows an embodiment of a sprag clutch.

FIG. 5 shows the mode adjustment mechanism 200 in the lock mode. The input gear 204, lock ring 212, one-way clutch 246, output shaft 216, and output gear 252 are again illustrated. The actuator 234 coupled to the locking ring 212 is also illustrated in FIG. 5. To place the mode adjustment mechanism in the lock mode, the actuator 234 is adjusted to induce engagement between the lock ring 212 and a stationary ground component 500. To elaborate, a spline 502 in the stationary ground component 500 may be mated with a spline 504 in the lock ring 212 in the lock mode. In this way, the lock ring 212 may be held substantially stationary. Therefore, in the lock mode, the torque transfer path through the mode adjustment mechanism may travel from the lock ring to the stationary ground component. The gearbox may transition into the lock mode when the vehicle is parked, for example. Consequently, the likelihood of the vehicle unintentionally moving when parked is decreased. Additionally, in the lock mode, the spline 230 in the lock ring 212 is shown engaged with the spline 232 in the output shaft and the spline 242 in the one-way clutch 246 is spaced away from the spline 236 in the lock ring 212. Allowing the mode adjustment mechanism to operate in the lock mode further expands the number of operational modalities available in the gearbox. Consequently, gearbox adaptability is increased.

FIG. 6 shows a sprag clutch 600. The sprag clutch 600 is an embodiment of the one-way clutch 246, shown in FIGS. 2-5. The sprag clutch 600 includes a plurality of sprag mechanisms 602 mounted on a carrier rings 604. The sprag mechanisms 602 may be spring loaded and rotate about axis 606. The sprag mechanisms 602 include curved surfaces 508 having asymmetric profiles. When a rotatable shaft on which the sprag clutch is mounted, such the output shaft 216 shown in FIGS. 2-5, rotates in one direction, the curved surfaces 508 frictionally engage an outer surface of the shaft. Contrariwise, when the shaft is rotated in the opposite direction the curved surfaces 608 in the sprag mechanisms 602 disengage and allow the shaft to freewheel, referred to herein as a freewheel configuration. The sprag clutch allows for quick and robust engagement between the clutch and the shaft when transitioning from the freewheel configuration to the engaged configuration.

FIGS. 2-6 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. Additionally, elements offset from one another may be referred to as such, in another example.

FIG. 7 shows a method 700 for operation of a gearbox in an electric drive axle. The method 700 may be carried out by the electric drive axles and gearboxes described above with regard to FIGS. 1-6. However, in other examples the method 700 may be implemented via other suitable electric drive axles and/or gearboxes. Furthermore, the method 700 may be stored in non-transitory memory of a controller. The method 700 may include instructions within a controller as well actions taken by the controller. As such, the method may include receiving signals from sensors and controllable components, sending commands to component actuators, and performing the commanded function through operation of the actuators.

At 702, the method includes determining operating conditions. The operating conditions may include motor-generator speed, motor-generator rotational direction, motor-generator temperature, lock ring configuration, energy storage device state of charge (SOC), gear selector position, vehicle state, etc. For example, the vehicle state may indicate a condition where the vehicle is being towed or anticipated to be towed.

At 704, the method includes determining the operating mode of the gearbox. For example, a driver request generated via an input device (e.g., gear selector) may be used to determine which operating mode the gearbox should be placed in. However, in other examples more automated gearbox mode selection techniques may be used. For instance, the controller may be configured to anticipate if the energy storage device's state of charge has or is expected to surpass a threshold value (e.g., 90% capacity, 98% capacity, 99% capacity, etc.) and in response transition the gearbox into the disconnect mode. In one specific use case example, it may be determined if the vehicle is being towed or anticipated to be towed and in response transition the gearbox into the disconnect mode. In another example, the controller may receive a request for lower speed or reverse vehicle operation and in response the gearbox may transition into the first gearing mode. Still further in other examples, the controller may receive a request for higher speed or forward drive vehicle operation and in response the gearbox may transition into the second gearing mode. In other examples, the controller may automatically determine whether to transition the gearbox into the first/second gearing modes. It will be appreciated that transitioning the electric drive axle into the different operating modes may include shifting the mode adjustment mechanism to couple and decouple splines in the lock ring with splines in the input gear and/or the housing of the one-way clutch.

At 706, the method includes implementing the disconnect mode, where the method includes blocks 708 and 710. At 708, the method includes rotationally decoupling the lock ring from the input gear. At 710, the method includes rotationally decoupling the lock ring from the housing of the one-way clutch. In this way, the motor-generator does not receive rotational input from or deliver rotational input to the gearbox.

At 712, the method includes implementing the first gearing mode where the method includes blocks 714 and 716. At 714, the method includes rotationally coupling the lock ring and the input gear, via spline engagement, for example. At 716, the method includes rotationally coupling the lock ring and the housing of the one-way clutch, via splined engagement, for example. In this way, the one-way clutch is bypassed and the lock ring and output gear jointly rotate. Consequently, back driving of the one-way clutch can be avoided, if desired. Furthermore, in the first gearing mode the activated gears in the gearbox have a first gear ratio.

At 718, the method includes implementing the second gearing mode, where the method may include blocks 720 and 722. At 720, the method includes rotationally coupling the lock ring and the input gear. Next at 722, the method includes rotationally decoupling the lock ring from the housing of the one-way clutch. In this way, the toque transfer path through the gearbox includes the one-way clutch, allowing the clutch to engage and co-rotate with the output gear, in one direction, and freewheel in the opposite direction. Furthermore, in the second gearing mode the activated gears in the gearbox have a second gear ratio different from the first gear ratio associated with the first gearing mode. For instance, the first gear ratio may be less than the second gear ratio or vice versa. In this way, the gear ratio of the gearbox may be adjusted based on vehicle operating conditions, allowing the gearbox to be adapted to exhibit desired wheel drive characteristics, on the fly, for instance.

At 724, the method includes implementing a lock mode, where the method includes block 726. At 726, the method includes rotationally coupling the lock ring and the ground component. In this way, the gear box may be held in a stationary mode, during for example parking of the vehicle. Consequently, the likelihood of the vehicle unintentionally moving when it is placed in park can be reduced. Implementing the lock mode may, in some examples, include and rotationally decoupling the lock ring from the housing of the one-way clutch rotationally decoupling the lock ring from the input gear. In this way, the torque transfer path in the lock mode may travel from the output gear to the output shaft to the lock ring and then to the stationary ground component.

It will be appreciated that the gearbox modes shown in FIG. 7 are mutually exclusive. That is to say, that while the gearbox is operating in one of the selected modes the other modes are not occurring. Furthermore, it will also be appreciated that the operating modes may be transitioned between depending upon operating conditions in the vehicle, driver input, etc. In this way, the gearboxes adaptability is expanded.

The technical effect of providing an electric drive axle having a gearbox with a lock ring operable in a disconnect mode and/or the other operating modes (e.g., the gearing modes and lock mode) is to expand the capabilities and adaptability of the gearbox. The disconnect mode may also allow the drive axle to avoid scenarios where the motor-generator creates unwanted current. Furthermore, providing the lock ring with disconnect functionality also allows the axle to achieve a relatively compact arrangement, if desired, while expanding the gearboxes modal functionality.

The invention will be further described in the following paragraphs. In one aspect, an electric drive axle, comprising: an electric motor-generator rotationally coupled to a gearbox comprising: a one-way clutch mounted on an output shaft and operable in an engaged configuration and a disengaged configuration, where in the engaged configuration, the one-way clutch transfers rotational energy from the output shaft to an output gear rotationally coupled to a plurality of drive wheels; and a mode adjustment mechanism including a lock ring rotationally coupled to the output shaft and configured to selectively engage an input gear and the one-way clutch in a plurality of operating modes.

In another aspect, a method for operating an electric drive axle in a vehicle is provided that comprises shifting a mode adjustment mechanism into a disconnect mode, in the disconnect mode a lock ring is rotationally disconnected from an input gear; where the input gear is rotationally coupled to an electric motor-generator; where a one-way clutch is mounted on an output shaft; where the mode adjustment mechanism includes the lock ring rotationally coupled to the output shaft; and where the output shaft is coupled to an output gear rotationally coupled to a plurality of drive wheels. In a first example, the method may further comprise shifting the mode adjustment mechanism into a first gearing mode, in the first gearing mode: rotational energy is transferred from the input gear to the lock ring; and rotational energy is transferred from the lock ring directly to a housing of the one-way clutch. In a second example, the method may further comprise shifting the mode adjustment mechanism into a second gearing mode, in the second gearing mode: rotational energy is transferred from the input gear to the lock ring; and rotational energy is transferred from the lock ring to the output shaft.

In yet another aspect, an electric drive axle is provided that comprises an electric motor-generator rotationally coupled to a gearbox comprising: a one-way clutch mounted on an output shaft and operable in an engaged configuration and a disengaged configuration, where in the engaged configuration, the one-way clutch transfers rotational energy from the output shaft to an output gear rotationally coupled to a plurality of drive wheels; and a mode adjustment mechanism including a lock ring rotationally coupled to the output shaft; where in a disconnect mode the lock ring in the mode adjustment mechanism is rotationally decoupled from the one-way clutch and the input gear.

In any of the aspects or combinations of the aspects, the mode adjustment mechanism may selectively engage the input gear and the one-way clutch via axial translation of the lock ring.

In any of the aspects or combinations of the aspects, the mode adjustment mechanism may be configured to operate in a disconnect mode where the lock ring is rotationally disconnected from the input gear and the one-way clutch.

In any of the aspects or combinations of the aspects, in the disconnect mode, a first lock ring spline in the lock ring may be decoupled from a gear spline in the input gear; and a second lock ring spline in the lock ring may be decoupled from a first clutch spline in a housing of the one-way clutch.

In any of the aspects or combinations of the aspects, the mode adjustment mechanism may be configured to operate in a first gearing mode in which: the lock ring is rotationally coupled to the input gear; and a housing of the one-way clutch is rotationally engaged with the lock ring.

In any of the aspects or combinations of the aspects, in the first gearing mode: a first lock ring spline in the lock ring may be in meshed engagement with a gear spline in the input gear; and a second lock ring spline in the lock ring may be in meshed engagement with a second clutch spline in the housing of the one-way clutch.

In any of the aspects or combinations of the aspects, in a second gearing mode, a first lock ring spline in the lock ring may be in meshed engagement with a gear spline in the input gear; and a second lock ring spline in the lock ring may be decoupled from a first clutch spline in a housing of the one-way clutch.

In any of the aspects or combinations of the aspects, the gearbox may further comprise a differential configured to transfer rotational energy to the plurality of drive wheels from the output gear.

In any of the aspects or combinations of the aspects, the one-way clutch may be a sprag clutch including a plurality of sprag mechanisms positioned between a housing of the one-way clutch and a surface of the output shaft.

In any of the aspects or combinations of the aspects, the mode adjustment mechanism may be shifted into the disconnect mode responsive to determining a vehicle tow condition, where the vehicle tow condition is a condition where the vehicle is being towed or anticipated to be towed via a towing vehicle configured to pull the vehicle.

In any of the aspects or combinations of the aspects, shifting the mode adjustment mechanism into the disconnect mode may include axially translating the lock ring away from the one-way clutch.

In any of the aspects or combinations of the aspects, the electric drive axles may include a differential configured to transfer rotational energy to the plurality of drive wheels from the output gear.

In any of the aspects or combinations of the aspects, the electric drive axle may further comprise a controller including instructions stored in non-transitory memory that when executed cause the controller to: shift the mode adjustment mechanism into the disconnect mode.

In any of the aspects or combinations of the aspects, the mode adjustment mechanism may be shifted into the disconnect mode responsive to determining an occurrence of a vehicle tow condition in a vehicle including the electric drive axle and where the vehicle tow condition is a condition where the vehicle is being towed or anticipated to be towed via a towing vehicle configured to pull the vehicle.

In any of the aspects or combinations of the aspects, the electric drive axle may further comprise a controller including instructions stored in non-transitory memory that when executed cause the controller to: shift the mode adjustment mechanism into a first gearing mode where: the lock ring is rotationally coupled to the input gear; and a housing of the one-way clutch is rotationally engaged with the lock ring.

In any of the aspects or combinations of the aspects, the electric drive axle may further comprise a controller including instructions stored in non-transitory memory that when executed cause the controller to: shift the mode adjustment mechanism into a second gearing mode where: a first lock ring spline in the lock ring is in meshed engagement with a gear spline in the input gear; and a second lock ring spline in the lock ring is decoupled from a spline in a housing of the one-way clutch.

In any of the aspects or combinations of the aspects, the mode adjustment mechanism may be shifted into the disconnect mode responsive to determining a state of charge of an energy storage device electrically coupled to the electric motor-generator has surpassed a threshold value.

In any of the aspects or combinations of the aspects, the mode adjustment mechanism may be configured to operate in a first gearing mode in which: the lock ring is rotationally coupled to the input gear; and a housing of the one-way clutch is rotationally engaged with the lock ring; where in the first gearing mode: a first lock ring spline in the lock ring may be in meshed engagement with a gear spline in the input gear; and a second lock ring spline in the lock ring may be in meshed engagement with a second clutch spline in the housing of the one-way clutch.

In any of the aspects or combinations of the aspects, the mode adjustment mechanism may be configured to operate in a lock mode where a spline in the lock ring is engaged with a ground spline.

In any of the aspects or combinations of the aspects, the method may further comprise shifting the mode adjustment mechanism into a first gearing mode, in the clutch—bypass mode: rotational energy is transferred from the input gear to the lock ring; and rotational energy is transferred from the lock ring directly to a housing of the one-way clutch; and shifting the mode adjustment mechanism into a second gearing mode, in the second gearing mode: rotational energy is transferred from the input gear to the lock ring; and rotational energy is transferred from the lock ring to the output shaft.

In any of the aspects or combinations of the aspects, the method may further comprise shifting the mode adjustment mechanism into a lock mode, in the lock mode: the lock ring is rotationally engaged with a stationary ground spline.

In another representation, a mode adjustment mechanism in an axle gearbox is provided which may include an axially translatable lock ring designed to selectively mesh with an input gear coupled to an electric motor and a one-way clutch coupled to a differential to rotationally couple and decouple the electric motor from the differential.

While various embodiments have been described above, it should be understood that they have been presented by way of example, and not limitation. It will be apparent to persons skilled in the relevant arts that the disclosed subject matter may be embodied in other specific forms without departing from the spirit or essential characteristics thereof. The embodiments described above are therefore to be considered in all respects as illustrative, not restrictive.

Note that the example control and estimation routines included herein can be used with various motor, gearbox, and/or vehicle system configurations. The control methods and routines disclosed herein may be stored as executable instructions in non-transitory memory and may be carried out by the control system including the controller in combination with the various sensors, actuators, and other vehicle hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of the computer readable storage medium in the vehicle control system, where the described actions are carried out by executing the instructions in a system including the various vehicle hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied electric vehicles, hybrid vehicles with engines having a variety of suitable configuration (e.g., V-4, I-4, I6, opposed 4, and other engine types). The subject matter of the present disclosure includes all novel and non-obvious combinations and sub-combinations of the various systems and configurations, and other features, functions, and/or properties disclosed herein.

As used herein, the terms "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An electric drive axle, comprising:
an electric motor-generator rotationally coupled to a gearbox comprising:
a one-way clutch mounted on an output shaft and operable in an engaged configuration and a disengaged configuration, where in the engaged configuration, the one-way clutch transfers rotational energy from the output shaft to an output gear rotationally coupled to a plurality of drive wheels; and
a mode adjustment mechanism including a lock ring rotationally coupled to the output shaft and configured to selectively engage an input gear and the one-way clutch in a plurality of operating modes;
where the lock ring is splined to the output shaft.

2. The electric drive axle of claim 1, where the mode adjustment mechanism selectively engages the input gear and the one-way clutch via axial translation of the lock ring.

3. The electric drive axle of claim 1, where the mode adjustment mechanism is configured to operate in a disconnect mode where the lock ring is rotationally disconnected from the input gear and the one-way clutch.

4. The electric drive axle of claim 3, where in the disconnect mode,
a first lock ring spline in the lock ring is decoupled from a gear spline in the input gear; and
a second lock ring spline in the lock ring is decoupled from a first clutch spline in a housing of the one-way clutch.

5. The electric drive axle of claim 3, where the mode adjustment mechanism is configured to operate in a first gearing mode in which:
the lock ring is rotationally coupled to the input gear; and
a housing of the one-way clutch is rotationally engaged with the lock ring; and where in the first gearing mode:
a first lock ring spline in the lock ring is in meshed engagement with a gear spline in the input gear; and
a second lock ring spline in the lock ring is in meshed engagement with a second clutch spline in the housing of the one-way clutch.

6. The electric drive axle of claim 1, where the mode adjustment mechanism is configured to operate in a lock mode where a spline in the lock ring is engaged with a ground spline.

7. The electric drive axle of claim 1, where in a second gearing mode,
a first lock ring spline in the lock ring is in meshed engagement with a gear spline in the input gear; and
a second lock ring spline in the lock ring is decoupled from a first clutch spline in a housing of the one-way clutch.

8. The electric drive axle of claim 1, where the gearbox further comprises a differential configured to transfer rotational energy to the plurality of drive wheels from the output gear.

9. The electric drive axle of claim 1, where the one-way clutch is a sprag clutch including a plurality of sprag mechanisms positioned between a housing of the one-way clutch and a surface of the output shaft.

10. A method for operating an electric drive axle in a vehicle, comprising:
shifting a mode adjustment mechanism into a disconnect mode, in the disconnect mode a lock ring is rotationally disconnected from an input gear; and
shifting the mode adjustment mechanism into a lock mode;
where in the lock mode the lock ring is rotationally engaged with a stationary ground spline;
where the input gear is rotationally coupled to an electric motor-generator;
where a one-way clutch is mounted on an output shaft;
where the mode adjustment mechanism includes the lock ring rotationally coupled to the output shaft; and
where the output shaft is coupled to an output gear rotationally coupled to a plurality of drive wheels.

11. The method of claim 10, further comprising:
shifting the mode adjustment mechanism into a first gearing-bypass mode, in the first gearing-bypass mode:
rotational energy is transferred from the input gear to the lock ring; and
rotational energy is transferred from the lock ring directly to a housing of the one-way clutch; and
shifting the mode adjustment mechanism into a second gearing mode, in the second gearing mode:
rotational energy is transferred from the input gear to the lock ring; and
rotational energy is transferred from the lock ring to the output shaft.

12. The method of claim 10, where the mode adjustment mechanism is shifted into the disconnect mode responsive to determining a state of charge of an energy storage device electrically coupled to the electric motor-generator has surpassed a threshold value.

13. The method of claim 10, where shifting the mode adjustment mechanism into the disconnect mode includes axially translating the lock ring away from the one-way clutch.

14. The method of claim 10, where the electric drive axle includes a differential configured to transfer rotational energy to the plurality of drive wheels from the output gear.

15. An electric drive axle, comprising:
an electric motor-generator rotationally coupled to a gearbox comprising:
- a one-way clutch mounted on an output shaft and operable in an engaged configuration and a disengaged configuration, where in the engaged configuration, the one-way clutch transfers rotational energy from the output shaft to an output gear rotationally coupled to a plurality of drive wheels; and
- a mode adjustment mechanism including a lock ring rotationally coupled to the output shaft;
- where in a disconnect mode the lock ring in the mode adjustment mechanism is rotationally decoupled from the one-way clutch and the input gear; and a controller including instructions stored in non-transitory memory that when executed cause the controller to:
shift the mode adjustment mechanism into a first gearing mode, where:
- the lock ring is rotationally coupled to the input gear; and
- a housing of the one-way clutch is rotationally engaged with the lock ring.

16. The electric drive axle of claim 15, further comprising a controller including instructions stored in non-transitory memory that when executed cause the controller to:
shift the mode adjustment mechanism into the disconnect mode.

17. The electric drive axle of claim 16, where the mode adjustment mechanism is shifted into the disconnect mode responsive to determining an occurrence of a vehicle tow condition in a vehicle including the electric drive axle and where the vehicle tow condition is a condition where the vehicle is being towed or anticipated to be towed via a towing vehicle configured to pull the vehicle.

18. The electric drive axle of claim 15, wherein the controller includes instructions stored in the non-transitory memory that when executed cause the controller to:
shift the mode adjustment mechanism into a second gearing mode where:
- a first lock ring spline in the lock ring is in meshed engagement with a gear spline in the input gear; and
- a second lock ring spline in the lock ring is decoupled from a spline in a housing of the one-way clutch.

* * * * *